United States Patent

Cook et al.

[11] Patent Number: 5,964,664
[45] Date of Patent: Oct. 12, 1999

[54] CV DRIVE SHAFT CONSTRUCTION

[76] Inventors: Estle A. Cook; Loretta E. Cook, both of Rte. 1, Box 196, Butler, Mo. 64730

[21] Appl. No.: 08/729,482

[22] Filed: Oct. 11, 1996

[51] Int. Cl.[6] .......................................................... F16D 3/16
[52] U.S. Cl. ............................ 464/117; 464/147; 464/185
[58] Field of Search ..................................... 464/113, 114, 464/117, 106, 147, 185; 74/15.63, 15.66, 15.69; 180/53.1

[56] References Cited

U.S. PATENT DOCUMENTS

| | | | |
|---|---|---|---|
| 1,935,811 | 11/1933 | Metcalf | 464/117 X |
| 1,999,841 | 4/1935 | MacGregor | 464/113 X |
| 2,139,963 | 12/1938 | Leason | 464/117 |
| 3,427,824 | 2/1969 | Mayrath | 464/117 |
| 3,483,683 | 12/1969 | McCanse | 464/117 X |
| 3,908,398 | 9/1975 | Braunberger | 464/117 X |
| 4,121,436 | 10/1978 | Garrison | 464/117 |
| 4,300,362 | 11/1981 | Lande et al. | 464/117 |
| 5,427,192 | 6/1995 | Stephenson et al. | 464/117 X |

Primary Examiner—Donald P. Walsh
Assistant Examiner—William A. Rivera

[57] ABSTRACT

A shaft construction transmits power from a vehicle to a driven mechanism located on an implement. The shaft construction includes a first shaft having a first end coupled to the driving shaft of the vehicle. A second end of the first shaft is coupled to a first end of a second shaft by a first universal joint. A second end of the second shaft is coupled to a driven shaft of the implement by a second universal joint. A positioning structure includes a first frame disposed adjacent the first universal joint and a second frame disposed adjacent the second universal joint. The first shaft is rotatably coupled to the positioning structure so that it is maintained substantially perpendicular to the first frame in the horizontal plane. The first and second frame members are connected by a pair of elongated links. Each of the links is pivotally secured at opposite ends to each of the frames. The links cross one another as they extend between the frames. This positioning structure maintains the angle between the first and second shafts substantially equal to the angle between the second shaft and the driven shaft of the implement in the horizontal plane.

1 Claim, 2 Drawing Sheets

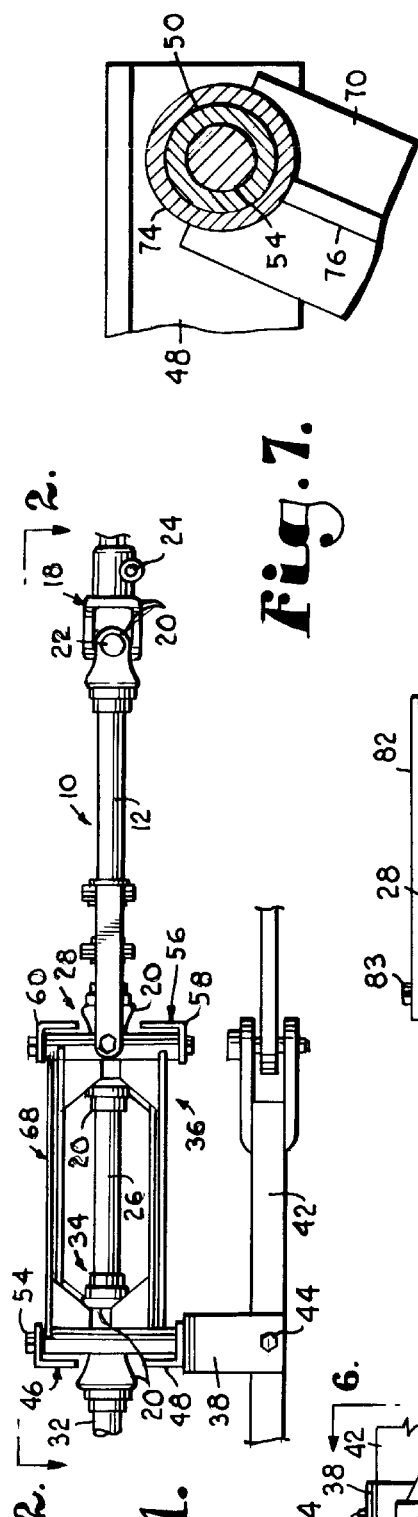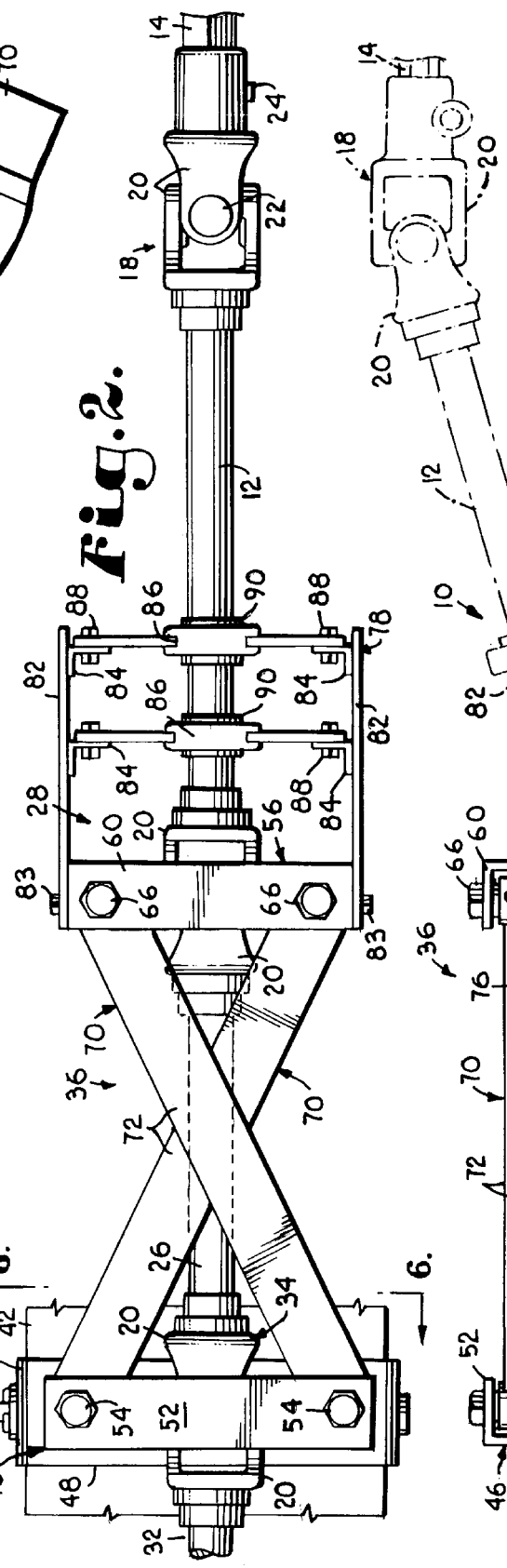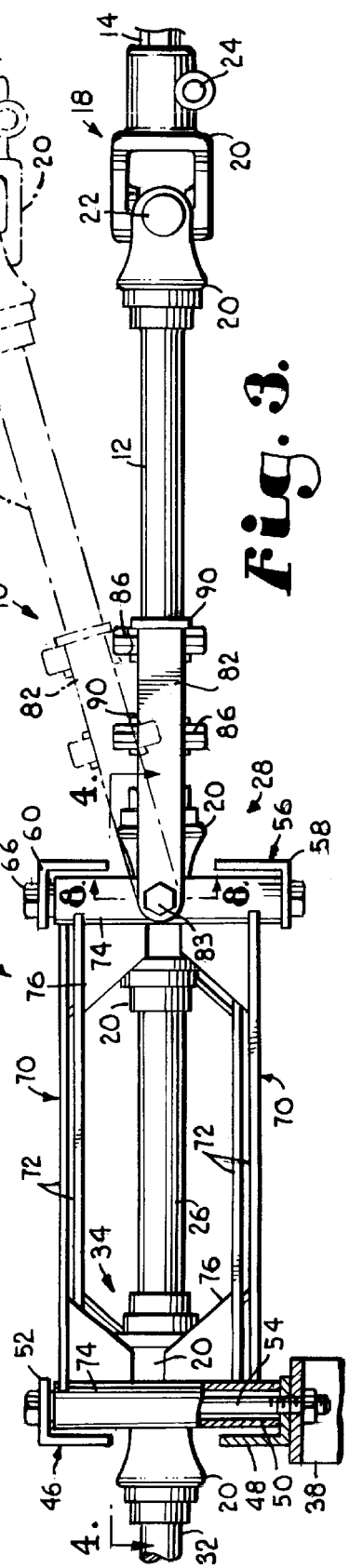

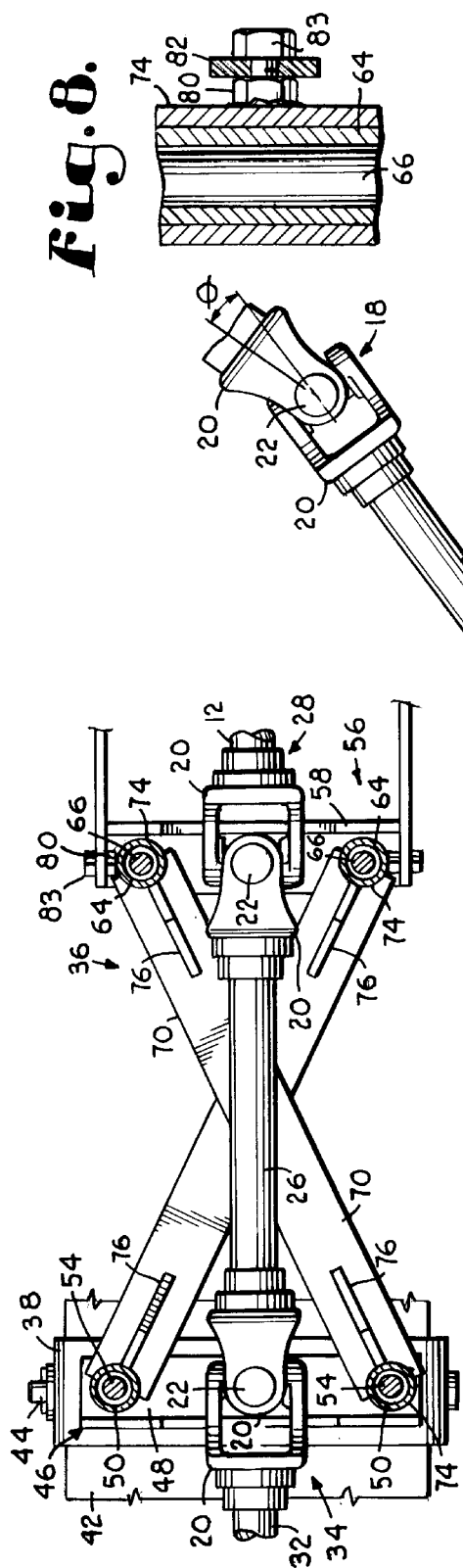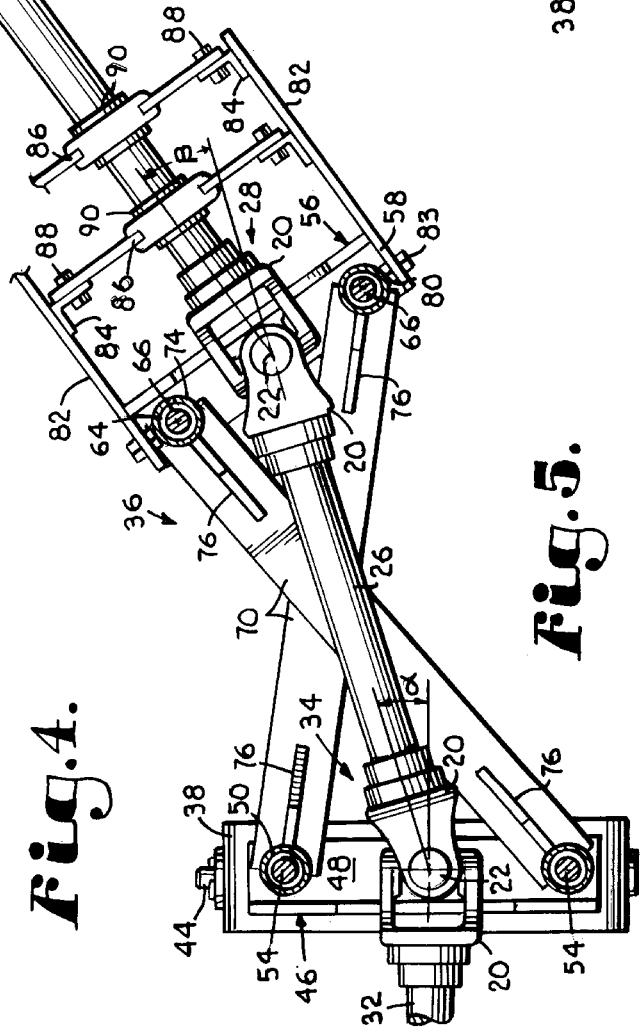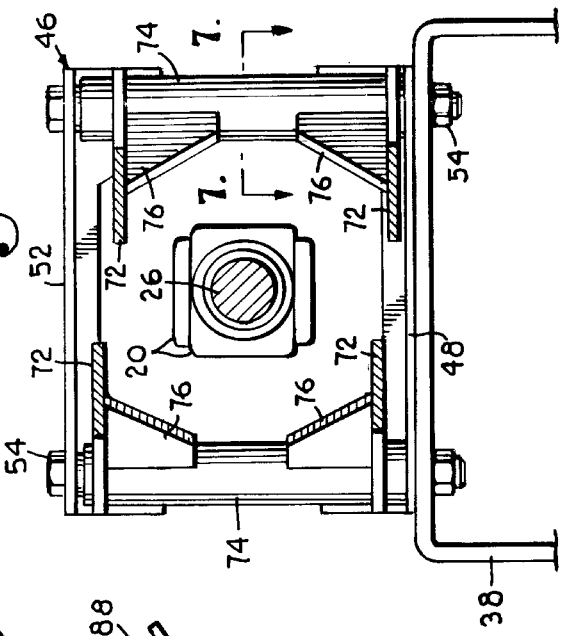

CV DRIVE SHAFT CONSTRUCTION

This invention relates to a drive shaft construction which permits angular displacement between the drive shaft sections and, more particularly, to a drive shaft construction which allows a substantially constant velocity to be transmitted therethrough.

Shaft sections subject to angular displacement of their axes with respect to one another are commonly interconnected by a universal joint to permit one shaft section to drive the other. The universal joint permits the sections to pivot at the connection and also permits the transmission of rotary motion from one section to the other.

In the farming industry, a drive shaft is typically used to transfer power from the power takeoff (PTO) of the tractor to the driven mechanism of a farm implement. For example, a drive shaft is normally used to transfer power to balers, mowers and swathers. Universal joints are used to couple the drive shaft to the PTO hub of the tractor and to the driven mechanism of the implement.

An ordinary universal joint, consisting of two yokes at right angles to one another and pivotally interconnected with a journal, causes a driven shaft to rotate at a variable speed with respect to the driving shaft which is disposed at an angle to the driven shaft. There is a cyclic variation, in the form of an acceleration and a deceleration of the speed, twice during each revolution. The extent of the fluctuation depends on the amount of angularity between the shafts. The greater the angle, the greater the variation in speed of the two shafts during each revolution.

These velocity fluctuations result because the journal connecting the two yokes does not allow free movement other than a pivoting action. The journal wobbles as the joint rotates. When the journal tilts toward the output shaft, it adds to the rotary speed of the output. When the journal tilts away from the output shaft it subtracts from the speed of the output. The input and output shaft speeds are equal only when the journal lies in a plane which bisects the angle between the shafts. Thus, during turning, the drive velocity transferred from the tractor to a farm implement fluctuates. This is very undesirable because it can cause overloading or "slugging" of the implement and/or prevent the implement from operating uniformly.

This variation of velocity cannot be eliminated with a simple universal joint. This effect can be minimized by using two universal joints (one at each end of the shaft). When two universal joints are employed, the second joint is used to compensate for the speed fluctuations caused by the first. In order to accomplish this, the angle between the drive shaft and the PTO hub of the tractor must be the same as the angle between the drive shaft and the driven shaft of the farm implement. Another requirement is that the two yokes of the universal joint which are attached to the drive shaft be in the same plane. It is known in the farm industry that this advantageous orientation can be achieved by positioning the hitch point of the implement to the tractor at a location that is midway of the drive shaft. This hitching configuration results in a substantially constant drive velocity being conveyed from the tractor through the drive shaft to the implement even during turning of the tractor. However, this hitching arrangement can be disadvantageous because oftentimes implements must be specially constructed to provide the proper spacing for the desired hitch relationship. Further, because a relatively long drive shaft is utilized and the shaft swings out of longitudinal alignment with the implement and the tractor during turning, the turning ratio of the tractor with an implement attached is limited. More specifically, as a tractor with an attached implement makes a turn, the drive shaft is no longer in longitudinal alignment with either the implement or the tractor. Thus, structures on the tractor (for instance, the rear wheels) and/or structures on the implement could contact the drive shaft. This prohibits sharp turning. Additionally, some universal joints may not be able to accommodate large angles when the drive shaft is turning at a high speed.

To alleviate the foregoing problems, special types of universal joints have been developed to provide for transmission of uniform speed across a joint. These joints are commonly called "constant velocity" joints. Such joints are constructed in a manner that a plane passed through the points of the driving engagement in the joint will at all times bisect the angle between the driving and the driven shaft.

Various constructions for universal joints have been devised to provide the desired constant velocity to be transmitted by the joint. The designs heretofore suggested for such constant velocity joints have had a number of distinct drawbacks. A major problem has been the complexity of such devices. Many such constructions involve a substantial number of moving parts, each requiring relatively complex machining operations during fabrications, and also requiring that manufacturing tolerances be held to very close limits. This has resulted in relatively high costs for such joints.

Further, because of the above-described drawbacks, constant velocity joints often prove unreliable, especially when used in a farming environment wherein they are exposed to dust, moisture and other deleterious substances. Because of their complexity, it is often impossible for users to repair the joints after they have become inoperative, especially in a field setting.

Thus, a drive shaft construction is needed which allows a substantially constant driving velocity to be transferred from a tractor to an implement. Further, a drive shaft construction is needed which utilizes standard easily obtained parts in a simple effective structure so that the shaft construction can withstand a hostile environment and be easily repaired and serviced by a user.

Accordingly, it is a primary object of the present invention to provide a drive shaft construction that allows a substantially constant driving velocity to be transferred from a tractor to an implement even during turning of the tractor.

Another important object of this invention is to provide a multi-section drive shaft construction that maintains the angles between each of the shaft sections substantially the same so that a substantially constant driving velocity can be transferred through the shaft construction.

A further object of the invention is to provide a constant velocity drive shaft with a simple construction that utilizes off-the-shelf standard parts so that it can be relatively easily manufactured and subsequently repaired or reworked by a user.

These and other important aims and objects of the present invention will be further described, or will become apparent from the following description and explanation of the drawings, wherein:

FIG. 1 is a side elevational view of a drive shaft construction embodying the principles of this invention, the drive shaft shown coupled to the PTO hub of a tractor and to the driven shaft of a farm implement;

FIG. 2 is an enlarged fragmentary top plan view taken generally along line 2—2 of FIG. 1 and showing the drive shaft sections longitudinally aligned;

FIG. 3 is an enlarged fragmentary side elevational view of the drive shaft shown in FIG. 1 and showing in phantom lines an alternative position of the forward shaft section resulting from vertical pivoting with respect to the cage;

FIG. 4 is a fragmentary detailed cross-sectional view taken generally along line 4—4 of FIG. 3;

FIG. 5 is a view similar to FIG. 4, but showing the drive shaft construction during turning of a tractor with an implement attached thereto;

FIG. 6 is an enlarged detailed cross-sectional view taken generally along line 6—6 of FIG. 2;

FIG. 7 is an enlarged fragmentary detailed cross-sectional view taken generally along line 7—7 of FIG. 6; and FIG. 8 is an enlarged fragmentary detailed cross-sectional view taken generally along line 8—8 of FIG. 3.

A constant velocity drive shaft construction embodying the principles of this invention is broadly designated in the drawings by the reference numeral 10. Construction 10 includes a shaft section 12 which is removably coupled to a power takeoff hub 14 of a tractor by a universal joint 18 as best shown in FIGS. 1–3 and 5. Joint 18 allows angular displacement between hub 14 and section 12. Joint 18 includes a pair of yokes 20 which are pivotally attached to a journal 22. The yoke 20 adjacent hub 14 is removably attached to hub 14 by a spring-loaded key arrangement 24.

At the end opposite joint 18, shaft section 12 is coupled to shaft section 26. Sections 12 and 26 are coupled via universal joint 28 so that they can be angularly displaced with respect to each other. Joint 28 includes a pair of yokes 20 and a journal 22. The yokes 20 attach to opposite ends of section 12 are removably but fixedly secured thereto by setscrews (not shown). The yokes 20 attached to section 12 are also oriented in the same plane as best shown in FIGS. 2 and 5.

Shaft section 26 is coupled to driven shaft 32 so that section 26 and shaft 32 can be angularly displaced with respect to one another. Section 26 and shaft 32 are coupled by a universal joint 34. Joint 34 also has a pair of yokes 20 pivotally attached to a journal 22. Shaft 32 extends rearwardly to drive the mechanism of an implement. Additionally, shaft 32 can have a telescoping portion, such as a splined slip joint, to allow for longitudinal variations in the location of construction 10, as will be more fully described below. The yokes 20 disposed on opposite ends of section 26 are oriented in the same plane as best shown in FIGS. 4 and 5. Further, these yokes are also removably secured in fixed position to the section by setscrews (not shown).

A positioning cage 36 is fixedly secured to the upper end of a connecting bracket 38 by a pair of bolt arrangements as best shown in FIGS. 1, 3 and 6 and as will be more fully described below. The lower end of connecting bracket 38 is pivotally attached to an implement hitch 42 at pivot points 44 as shown in FIG. 1. Thus, cage 36 can pivot forwardly and rearwardly in a vertical plane above hitch 42.

Cage 36 has a frame 46 which is disposed on top of bracket 38. Frame 46 includes a lower L-shaped plate 48, an upper L-shaped plate 52, a pair of bushings 50, and a pair of bolts 54. Frame 46 generally forms a rectangle which surrounds but does not contact universal joint 34. Each bolt 54 is received through a corresponding aperture in upper plate 52, through an inner bore of its corresponding bushing 50, and through a corresponding aperture in lower plate 48. The lower end of bolts 54 extend through apertures in the top of bracket 38 and are secured thereto by nuts in order to affix cage 36 to bracket 38.

Cage 36 further includes a frame 56 disposed forwardly of frame 46. Frame 56 includes a lower L-shaped plate 58, an upper L-shaped plate 62, a pair of bushings 64, and a pair of bolts 66. Frame 56 generally forms a rectangle which surrounds but does not contact universal joint 34. Each bolt 66 is received in a corresponding aperture in upper plate 58 through the inner bore of its corresponding bushing 64, and through a corresponding aperture in lower plate 58.

Frames 46 and 56 are connected by a crossbar linkage 68. Linkage 68 includes a pair of cross links 70. Each link 70 has a pair of parallely disposed elongated bars 72 and a pair of tube members 74. Tube members 74 are disposed and attached to opposite ends of bars 72 to support the bars in their parallel orientation. Bars 72 are preferably connected to tubes 74 by welding. Gussets 76 are used to support the connections of the bars to the tubes. Each tube 74 surrounds and is pivotally mounted to its respective bushing 50 or 64 depending upon which end of the link it is located on. Each link 70 extends from a bushing 50 of frame 46 to a bushing 64 of frame 56 that is diagonally across from the bushing 50. Links 70 are vertically offset from one another such that when their bars 72 cross one another they do not come into contact as best shown in FIGS. 1 and 3. Further, linkage 68 is disposed around but does not come into contact with shaft section 26.

A connecting structure 78 is pivotally mounted to trunnions 80 extending from the tubes 74. Structure 78 has parallely disposed elongated arms 82. Each arm 82 has an aperture formed therein which is aligned with the aperture in its respective trunnion 80, and a bolt 83 is used to pivotally secure the arm thereto as best shown in FIG. 8.

Two sets of brackets 84 are attached to the interior surfaces of arms 82 by, for example, welding. Each set of brackets supports a bearing receiving flange 86. Each flange 86 has two separate portions (not shown) which are held together and to their respective set of brackets by bolts 88. Each flange 86 receives a bearing 90 which is preferably of a sealed bearing type. The inner bore of each bearing 90 receives and is secured to a portion of shaft section 12. The outer peripheral surface of each bearing 90 engages and is secured within its respective flange 86. Structure 78 allows pivotal movement of shaft section 12 with respect to frame 56 in a vertical plane as shown in FIG. 3. However, structure 78 ensures that shaft section 12 does not pivot with respect to frame 56 in a horizontal plane, but remains in a generally perpendicular relationship to frame 56 even when frame 56 is rotated with respect to frame 46 as shown in FIG. 5.

In operation, shaft section 12 is attached to hub 14 through joint 18. Driven shaft 32 extends rearwardly and is permanently coupled to the driving mechanism of the implement. As described, shaft 32 preferably has a slip joint in it to allow variation in its length. This slip joint allows cage 36 to pivot forwardly and rearwardly about the pivot points of bracket 38. This longitudinal movement allows the drive shaft construction 10 to remain attached to the hub 14 even while the tractor is covering rough terrain which may result in variations in the distance between the hub 14 and the driven mechanism of the implement. Further, the pivoting of cage 36 on bracket 38 allows for a reduction in stress in the drive shaft construction during turning of the tractor.

As the tractors turns, the angle between driven shaft 32 and shaft section 26 (angle $\alpha$) is maintained so that it is substantially equal to the angle between shaft section 26 and shaft section 12 (angle $\beta$) as shown in FIG. 5. The angles $\alpha$ and $\beta$ are maintained substantially equal to each other during turning because of the nature of crossbar linkage 68 and the fixed positioning of shaft section 12 so that section 12 rotates with frame 56 in the horizontal plane.

During operation, the angle between hub 14 and shaft section 12 (angle $\theta$) will be minimal so that the constant velocity characteristics of the device will be substantially preserved. More particularly, when the tractor and the implement are aligned the value of the angle θ will be substantially 0°. Further, during execution of a turn, as shown in FIG. 5, angles α and β will comprise almost all of the necessary turning action and angle θ will be maintained at a minimal value. Because the value of angle θ is kept to a minimal amount, the constant velocity characteristics of the drive shaft construction are not substantially affected.

Shaft construction 10 utilizes two shaft sections and at least two universal joints to maintain the rotary drive from the tractor to the implement while permitting the tractor to turn with respect to the implement. Therefore, the construction maintains better alignment between the hitch of the implement and the drawbar of the tractor than prior art structures which utilize only one drive shaft extending between the tractor and the implement. Construction 10 does not swing as far out of longitudinal alignment with the implement or the tractor as prior art drive shafts. This, along with the two angles of motion, allows for increased turning capacity of the tractor with the implement attached thereto while transferring a substantially constant velocity to the implement. More specifically, it has been found that, with this invention, a tractor can easily execute a turn in which the tractor is oriented 90 degrees with respect to the implement with the mechanism of the implement powered at a substantially constant velocity.

In order to ensure the substantially constant velocity characteristics of the construction, the yokes 20 located on opposite ends of shaft sections 12 should lie in the same plane and the yokes 20 located on opposite ends of shaft section 26 should also lie in the same plane as best shown in FIG. 5.

Further, it has been found to be preferable to position joint 28 with respect to frame 56 so that when the shaft sections 12 and 26 are aligned as shown in FIG. 4, both pivotal axes of the journal of the joint lie in substantially the same vertical plane that intersects the pivot connections of links 70 to frame 56. This orientation increases the constant velocity characteristics of and decreases the stresses in the shaft construction when the construction deviates from the straight line orientation during turning of the tractor as shown in FIG. 5. It has also been found to be preferable to align trunnions 80 in the same vertical plane as the pivot connections of links 70 to frame 56.

Joint 34 is also preferably aligned with respect to frame 46 such that, when the shaft sections 12 and 26 are aligned, both axes of the journal are in the same vertical plane as the point of connection of links 70 to frame 46. As described with regard to joint 28, this orientation helps ensure the constant velocity joint 28, this orientation helps ensure the constant velocity characteristics of the shaft construction and further reduces stresses in the shaft construction.

It has also been found that cage 36 can be made so that the distance between bushings 50 of frame 46 is slightly greater than the distance between bushings 64 of frame 56. Conversely, cage 36 can be made with the distance between bushings 64 slightly greater than the distance between bushings 50. These design characteristics result in frame 56 being able to obtain a more acute pivotal motion with respect to frame 46, and thus result in a sharper turning ratio. Further, these slight modifications in distance are not likely to substantially affect the transmission of a substantially constant velocity through the shaft construction.

Shaft construction 10 can be easily shielded for safety and protection against dirt and moisture. More particularly, a rigid shield can easily be positioned from frame 56 to enclose shaft section 12. Further, a rubber boot can be used to enclose cage 36. Because the driven shaft 32 does not rotate, it too can be rigidly shielded by an appropriate structure.

Construction 10 can be made easily of standard inexpensive off-the-shelf components. More specifically, universal joints 18, 28, and 34 can be of a simple standard variety and of any suitable size. Additionally, shaft sections 12 and 26 can be of any suitable size and, in fact, can be made with different lengths without affecting the constant velocity characteristics of construction. Further, bearings 90 can be of a simple sealed bearing variety and can be mounted using standard bearing flanges the cage construction can be manufactured by utilizing simple machining and welding equipment and, further, can utilize off-the-shelf parts, for example, bolts 54 and 66 and bushings 50 and 64. All the components can also be replaced in the construction by simply removing the appropriate yoke, flange, and/or bolt.

Although only one cage 36 is depicted in the drawings and described, a drive shaft construction can be made with any number of cages positioned where turning motion occurs in order to preserve the constant velocity characteristics of the construction.

Having described the invention, what is claimed is:

1. A constant velocity drive shaft for carrying center universal joint of drive shaft adapted to maintain equal angles when turning up to 90 degrees, for transmitting power from a vehicle to a driven mechanism located on an implement, said construction comprising a first shaft having a first end and a second end, said first end coupled to the driving shaft of the vehicle, a second shaft having a first end and a second end, said first end coupled to said second end of said first shaft by a first universal joint and said second end of said second shaft adapted to be coupled to the driven shaft of the implement by a second universal joint; and a positioning structure including a first frame disposed adjacent said first universal joint and a second frame disposed adjacent said second universal joint, said first shaft being rotatably coupled to said positioning structure so that said first shaft is maintained substantially perpendicular to said first frame in the horizontal plane, said first and second frame members connected by a pair of elongated links, each of said links pivotally secured at opposite ends to each of said frames, said links diagonally crossing one another as they extend between said frames, said positioning structure adapted to maintain an angle between said first and second shafts substantially equal to an angle between said second shaft and the driven shaft of the implement in the horizontal plane; the shaft construction wherein each of said links includes two substantially parallel bars with one of said bars positioned above said second shaft and the other of said bars positioned below said second shaft, wherein the pivot axes of said first universal joint lie in a substantially vertical plane that intersects the connection locations of said links to said first frame when said first and second shafts are aligned, wherein the pivot axes of said second universal joint lie in a substantially vertical plane that intersects the connection locations of said links to said second frame when said first and second shafts are aligned, wherein said first shaft is coupled to said positioning structure by connecting means for allowing said first shaft to pivot up and down in a substantially vertical plane, wherein said connecting means includes two parallel arms pivotally attached adjacent opposite sides of said first frame, the connection locations of said arms lying in a substantially vertical plane that intersects the connection locations of said links to said first frame, wherein said positioning structure is attached to the implement by an attaching bracket, said attaching bracket being pivotally secured to the implement and rigidly secured to said positioning structure so that said positioning structure is allowed to move longitudinally in response to relative motion between the implement and the vehicle, wherein the distance between the connection locations of said links to said first frame are substantially the same as the distance between the connection locations of said links to said second frame, wherein the distance between the connection locations of said links to said first frame is less than the distance between the connection locations of said links to said second frame.

* * * * *